United States Patent [19]
Chapman et al.

[11] Patent Number: 5,946,304
[45] Date of Patent: Aug. 31, 1999

[54] METHOD AND APPARATUS FOR CONTROLLING THE OPERATION OF A MODEM CAPABLE OF TRANSMITTING AND RECEIVING BOTH VOICE AND DATA SIGNALS

[75] Inventors: Joseph Quinn Chapman; Kurt Ervin Holmquist, both of Largo, Fla.

[73] Assignee: Paradyne Corporation, Largo, Fla.

[21] Appl. No.: 08/781,154

[22] Filed: Jan. 8, 1997

[51] Int. Cl.[6] .............................. H04J 1/02; H04M 11/00
[52] U.S. Cl. ....................... 370/276; 370/493; 379/93.34
[58] Field of Search ................................... 370/276, 384, 370/477, 493, 496; 379/93.34

[56] References Cited

U.S. PATENT DOCUMENTS

| | | | |
|---|---|---|---|
| 4,512,013 | 4/1985 | Nash et al. | 370/69.1 |
| 4,546,212 | 10/1985 | Crowder, Sr. | 179/2 C |
| 4,672,602 | 6/1987 | Hargrave et al. | 370/58 |
| 4,757,495 | 7/1988 | Decker et al. | 370/76 |
| 5,473,675 | 12/1995 | Chapman et al. | 379/93.34 |
| 5,574,725 | 11/1996 | Sharma et al. | 370/493 |
| 5,602,846 | 2/1997 | Holmquist et al. | 370/493 |
| 5,606,599 | 2/1997 | O'Mahony et al. | 379/93.34 |
| 5,625,679 | 4/1997 | Gutzmer | 379/93.34 |
| 5,684,825 | 11/1997 | Ko | 370/493 |
| 5,692,035 | 11/1997 | O'Mahony et al. | 370/493 |
| 5,719,922 | 2/1998 | Bremer et al. | 370/493 |
| 5,764,628 | 6/1998 | Davis et al. | 370/271 |

*Primary Examiner*—Brian Zimmerman
*Assistant Examiner*—Edward Merz
*Attorney, Agent, or Firm*—Thomas, Kayden, Horstemeyer & Risley, L.L.P.

[57] ABSTRACT

The present invention enables a dial modem capable of simultaneous voice and data (SVD) operation and connected to a conventional telephone set to automatically select between SVD operation, analog voice operation and digital data operation when transmitting or receiving communication signals based on the position of the telephone set's hookswitch. The invention includes a hookswitch position detector, connected to the telephone set, for sensing the current position of the hookswitch, and a signal controller, connected to the hookswitch position detector. The signal controller may be configured to enable either of two hookswitch control option settings. The hookswitch control option settings determine the manner in which the controller responds to the current hookswitch position ("on-hook" or "off-hook") detected by the hookswitch position detector. The first hookswitch control option setting causes the signal controller to disable the initiation of SVD operation by the modem when originating and receiving calls if the hookswitch position detector indicates that the hookswitch position is "off-hook." The second hookswitch control option setting causes the signal controller to enable the initiation of SVD operation by the modem when originating and receiving calls if the hookswitch position detector indicates that the hookswitch position is "off-hook."

14 Claims, 1 Drawing Sheet

METHOD AND APPARATUS FOR CONTROLLING THE OPERATION OF A MODEM CAPABLE OF TRANSMITTING AND RECEIVING BOTH VOICE AND DATA SIGNALS

FIELD OF THE INVENTION

The present invention relates to a method and apparatus for establishing a communications link between modems having the capability of simultaneously transmitting analog voice and digital data signals.

BACKGROUND OF THE INVENTION

The ability to simultaneously communicate analog and digital signals through a communications channel is well known. In one such prior art technique, voice and data signals are typically transmitted via either frequency-division multiplexing or time-division multiplexing. In frequency-division multiplexing, the data channel and voice channel are allocated different sub-bands of the channel's bandwidth, as for example disclosed in U.S. Pat. Nos. 4,546,212, 4,672,602 and 4,757,495. In time-division multiplexing, voice signals are sampled, digitized, and interleaved with digital data to form a single information stream that is communicated over the available channel. Many digital carrier systems, as for example a T1 carrier system, use such time-division multiplexing. In another communications method disclosed in U.S. Pat. No. 4,512,013, a technique similar to frequency division multiplexing is used to attain simultaneous voice and data half-duplex operation. Finally, co-pending U.S. patent application Ser. No. 08/076,526, the disclosure of which is incorporated herein by reference, teaches a method for simultaneously transmitting voice and data, or either voice or data alone, through a communications channel in a non-multiplexed manner using a generally coextensive frequency band.

In each of the foregoing techniques, a modem interconnects associated telephone and data terminal equipment (DTE) to other remote telephones and data terminal equipment through a communications link that is typically part of (or otherwise connected with) the public switched telephone network (PSTN). The modem must appropriately interact with its associated telephone and DTE for incoming and outgoing calls. For incoming calls, such interaction includes providing an off-hook signal to the communications link and ringing the phone for voice calls, or appropriately forwarding the incoming data to the DTE, or a combination of both these functions. One prior art technique of providing this interaction for a communication comprising simultaneously-transmitted or coupled voice and data signals requires that the communication be established by using an applications program that activates a modem's autodialer. The users at each end of the communications link are expected to be "standing by" and, when the applications program detects or recognizes the receipt of an incoming data signal, the respective telephones are taken off hook. The obvious drawback of this procedure is that it requires that communications be pre-scheduled. In addition, the communication begins as only a data call with voice communication being subsequently added thereto.

While the foregoing methodology provides satisfactory functionality, it is not suitable for many communications users who use their voice and data communications equipment in a typically arbitrary, unscheduled, and unplanned manner. There is therefore a significant unmet need for a technique in which a modem interacts with its associated telephone or voice equipment and DTE in a manner compatible with such normal usage.

SUMMARY OF THE INVENTION

The disadvantages and limitations discussed above are overcome by the present invention. The apparatus of the invention enables a dial modem capable of simultaneous voice and data (SVD) operation and connected to a conventional telephone set to automatically select SVD operation, analog voice operation, or digital data operation when transmitting or receiving communication signals, based on the position of the telephone set's hookswitch.

The present invention includes a conventional SVD modem having a hookswitch position detector for sensing the position of the telephone set's hookswitch, and a signal controller for selecting the dial modem operation (SVD or other) in response to a signal—indicating the position of the hookswitch as being "on-hook" or "off-hook"—received from the hookswitch position detector. The SVD modem is typically connected to, and controlled by, data terminal equipment which enables a user to issue control and configuration commands to the modem via application software running on the data terminal equipment For example, the user may issue a command through the data terminal equipment to configure the modem to transmit digital data in either a facsimile-only or standard data operation. The signal controller can be configured with one of two hookswitch control option settings, preferably via a command received from the data terminal equipment The hookswitch control option settings determine how the controller responds to the current hookswitch position detected by the hookswitch position detector.

The first hookswitch control option setting causes the signal controller to disable the initiation of SVD operation by the modem, when originating and receiving calls, when the hookswitch position detector indicates that the hookswitch position is "off-hook." Thus, if the modem is used to originate a call, the telephone set hookswitch is in the "off-hook" position, and the signal controller is configured with the first option setting, the call will be assumed to be analog voice only and the modem will not initiate SVD operation. However, if the telephone set hookswitch is in the "on-hook" position the call will be assumed to be data only and the modem will attempt to initiate a connection using facsimile or standard data operation as configured by the user. Similarly, if the first option setting is selected when the modem is set to receive a call originated from another user, the modem will ignore a call received when the telephone set hookswitch is in the "off-hook" position. However, the modem will answer the call, and proceed to establish a normal communication session with the originating modem in either the data or the fax mode (as configured), when the telephone set hookswitch is in the "on-hook" position. The modem will only use SVD operation if requested by the originating modem.

The second hookswitch control option setting causes the signal controller to enable the initiation of SVD operation by the modem, when originating and receiving calls, when the hookswitch position detector indicates that the hookswitch position is "off-hook." Thus, if the modem is used to originate a call with the telephone set hookswitch in the "off-hook" position, and the signal controller is configured with the second option setting, the call will be assumed to be SVD, and the modem will attempt to initiate a data connection in either the data or the fax mode (as configured) using SVD operation. However, if the telephone set hookswitch is in the "on-hook" position, the call will be assumed to be data only and the modem will attempt to initiate a data connection in either the data or the fax mode (as configured) without using STD operation. Similarly, if the second option setting is selected when the modem is set to receive a call originated from another user, the modem will answer a call received when the telephone set hookswitch is in the "off-hook" position and determine whether the originating modem has SVD capability. If the originating modem has SVD capability, the modem will establish a communication session with the originating modem in either the data or the fax mode (as configured) using SVD operation. If a call is received while the hookswitch is in the "on-hook" position, or if a call is received while the hookswitch is "off-hook" but the originating modem has no SVD capability, the modem will proceed to establish a normal communication session with the originating modem in either the data or the fax mode (as configured).

Other features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

BRIEF DESCRIPTION OF THE DRAWING

The FIGURE is a schematic block diagram illustrating a preferred implementation and embodiment of the present invention.

DETAILED DESCRIPTION OF THE PREFERRED EMBODIMENTS

Figure 1:
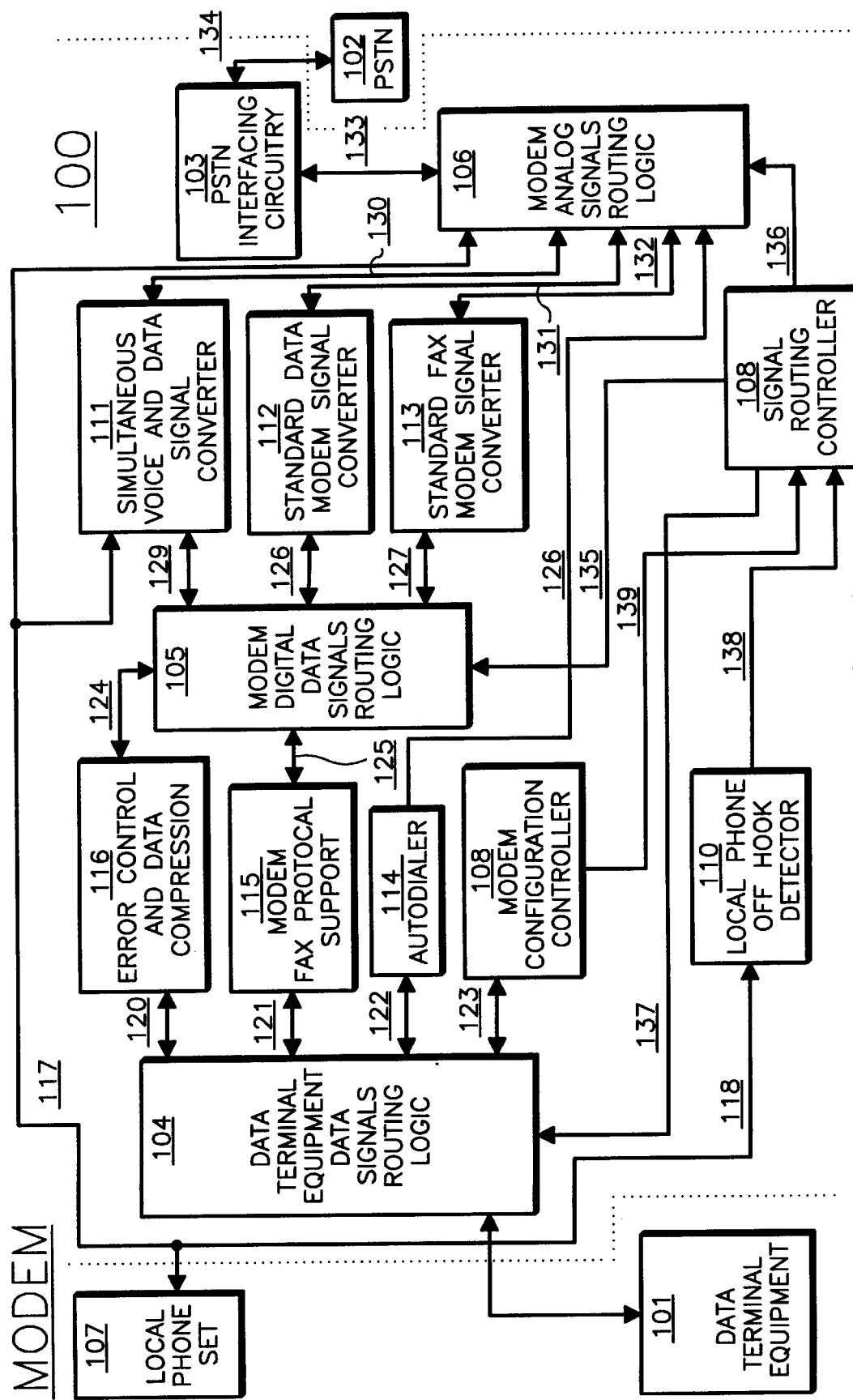

The drawing FIGURE depicts a schematic block diagram of a currently preferred apparatus for implementing the simultaneous voice-data (SVD) transmission technique of the present invention. In the FIGURE, block 100 represents a dial modem constructed to incorporate the features and functionality of the invention but otherwise of generally conventional form. Thus, modem 100 is operable for transmitting and receiving data, including simultaneously coupled analog voice and digital data, using any of several different well-known operation types or techniques. For the purposes of illustrating the operation of the present invention, these various operation capabilities are operatively provided by three signal converters: a simultaneous voice and data signals converter 111 for use in simultaneous voice-data (i.e. analog and digital) communication sessions, a standard data modem signal converter 112 for standard (and/or, optionally, proprietary) Public Switched Telephone Network (PSTN) data operation protocols (including, by way of nonlimiting example, V.32bis, V.32, V.22bis, etc.), and a fax modem signal converter 113 for the operation protocols commonly used in facsimile transmission (including by way of example V.17, V.29, V.27ter and V.21). Other operation schemes or capabilities for handling these and other varieties or formats of data signals may, of course, also or alternatively be incorporated in the modem 100 as a general matter of design choice. As is the case for most contemporary dial modem products, the herein-disclosed modem depicted in the FIGURE is also capable of performing various types of processing of the data stream moving between associated or connected data terminal equipment (DTE) 101 and the signal converters 111, 112, 113. This processing is effected in, inter alia, an error control and data compression processor 116 for implementing or identifying error and data compression protocols (such as V.42, V.42bis, etc.), and a modem-resident fax protocol support processor 115 for implementing or supporting facsimile transmission protocols (such as T.30). The error control and data compression processor 116 is preferably configured for use with either the standard data signal converter 112 or the SVD signal converter 111. The facsimile protocol data can be transmitted either by the facsimile signal converter 113 or, through use of a technique for simulating switched carrier operation as disclosed in U.S. patent application Ser. No. 08/150,640, now abandoned, the disclosure of which is incorporated by reference herein, via the SVD signal converter 111.

Modem 100 additionally includes an autodialer 114 that is responsive both to commands from the DTE 101 to establish an outbound call initiated by dialing a remote party's telephone or network number and to answer an incoming call, and which also reports to DTE 101 the progress in carrying out these commands or functions. The signal path between autodialer 114 and the PSTN 102 for implementing its various functions, such as issuance of outbound dialing commands and detection of oncoming ring signals, is provided through analog signals routing logic 106 and PSTN interfacing circuitry 103 for connection to the PSTN 102 via signal transmission line or communications link 134. Modem 100 also includes a modem configuration controller 108 that responds to commands received from DTE 101, or otherwise input to the modem (as for example manually or under user-initiated software or application program control) to select the operating mode of the modem—as for example selection between a first facsimile-only transmission mode, and a second standard data-only transmission mode.

Inasmuch as the inventive modem 100 is capable of numerous distinct modes of operation, the particular configured mode and the current phase of operation at any given time necessarily define the precise scheme used to route the signals as they make their way from DTE 101, through the modem's digital data stream processors to the signal converters 111, 112 and 113, and finally to the PSTN 102, and to provide similar routing for signals oppositely directed or traveling from the PSTN 102 to DTE 101. Illustratively, this routing functionality is shown in accordance with the present invention as being provided by three signal selectors 104, 105, 106, all controlled (through respective signal lines 137, 135, 136) by a signal routing controller 109. More particularly, the DTE data signals routing logic selector 104 provides a signals routing connection between DTE data streams, transmitted to and received from DTE 101 through signal line 119, and each of a modem configuration controller 108, the autodialer 114, a modem fax protocol support processor 115, and the error control and data compression processor 116 (through respective signal lines 123, 122, 121, 120). The digital data signals routing logic selector 105 provides a signals routing connection between each of the processors 115, 116 (through respective signal lines 125, 124) and the signal converters 111, 112, 113 (through respective signal lines 129, 128, 127). Finally, the analog signals routing logic selector 106 provides a signals routing connection between each of the converters 111, 112, 113, 114 (through respective signal lines 130, 131, 132, 126) and the PSTN interfacing circuitry 103 (through signal line 133).

In prior art modems, the operation of signal routing controller 109 is primarily effected in accordance with the input through signal line 139 from modem configuration controller 108. As described hereinbelow, the present invention provides to controller 109 an additional input for use in operatively selecting the appropriate modem operating mode and the internal data processing and transmission path(s) to be employed for an outbound or incoming communication session. Those skilled in the art will also appreciate that other operation-affecting inputs to controller 109—as for determining particular operations of controller 109 based (by way of example) on the presence (or absence) of ringing, dial tone, answer tone, and like signals received from the PSTN 102—are not shown in the FIGURE but are preferably included as in conventional modems.

Thus, and in accordance with the present invention, modem 100 further includes a local telephone off-hook detector 110 for dynamically monitoring and identifying, through signal line 118, the current condition or operating position of the hookswitch—as normally determined by the on-hook or off-hook status of the handset—of the local telephone (i.e. voice) set 107. It is, as is well known, normally through the local telephone set 107 that analog voice signals are input to and received by a user from the communications path to which a remote telephone set (or other voice-accommodating device) is connected. Detector 110 is connected through signal line 138 to signal routing controller 109 for providing to controller 109 an indication of the current position of the telephone set hookswitch. In accordance with the invention, the detected hookswitch position is utilized by controller 109 as an additional criteria for use in operatively controlling the appropriate current operating mode, the selected function set or features of the modem 100, and the signal routing path. This functionality advantageously provides the user of the inventive modem 100 with an expeditious manner of readily establishing, through user-effected manual control of the local telephone hookswitch position, the desired operating mode or feature set of the modem.

The controller 109 can be configured with one of two hookswitch control option settings via a command received from DTE 101, or otherwise input to the modem (as for example manually or under user-initiated software or application program control). The hookswitch control option settings determine how the controller 109 responds to the current hookswitch position detected by the detector 110.

The first hookswitch control option setting causes the controller 109 to disable the initiation of SVD operation when originating and receiving calls if the detector 110 indicates that the hookswitch position is "off-hook." Thus, if the modem 100 is used to originate a call, the telephone set hookswitch is in the "off-hook" position, and the controller 109 is configured with the first option setting, the call will be assumed to be voice only and the modem 100 will not initiate SVD operation. The autodialer 114 is used only for the purpose of placing the call, and the modem 100 does not send, or respond to, a notification signal. If the modem 100 is used to originate a call, the telephone set hookswitch is in the "on-hook" position, and the controller 109 is configured with the first option setting, the call will be assumed to be data only and the modem will attempt to initiate a normal data connection in either the data or the fax mode (as configured). If the modem 100 is set to receive a call originated from another user, the telephone set hookswitch is in the "off-hook" position, and the controller 109 is configured with the first option setting, the modem 100 will answer the call without initiating SVD operation and, if a notification signal is detected, the modem 100 will pass a "no-ring" indication to the DTE 101, thus aborting the call. If the modem 100 is set to receive a call originated from another user, the telephone set hookswitch is in the "on-hook" position, and the controller 109 is configured with the first option setting, the modem 100 will answer the call and will proceed to establish a normal communication session with the originating modem in either the data or the fax mode (as configured). The modem 100 will not initiate SVD operation; however, if SVD operation is requested by the originating modem, then SVD operation will be used to establish the communication session.

The second hookswitch control option setting causes the controller 109 to enable the initiation of SVD operation when originating and receiving calls if the detector 110 indicates that the hookswitch position is "off-hook." Thus, if the modem 100 is used to originate a call, the telephone set hookswitch is in the "off-hook" position, and the controller 109 is configured with the second option setting, the call will be assumed to be SVD, and the modem 100 will attempt to initiate a data connection in either the data or the fax mode (as configured) using SVD operation. If the modem 100 is used to originate a call, the telephone set hookswitch is in the "on-hook" position, and the controller 109 is configured with the second option setting, then the call will be assumed to be data only and the modem 100 will attempt to initiate a data connection in either the data or the fax mode (as configured) without using SVD operation. If the modem 100 is set to receive a call originated from another user, the telephone set hookswitch is in the "off-hook" position, and the controller 109 is configured with the second option setting, then the modem 100 will answer the call and then determine whether the originating modem has SVD capability. If the originating modem has SVD capability, the modem 100 will establish a communication session with the originating modem in either the data or the fax mode (as configured) using SVD operation. Otherwise the modem 100 will establish a normal, non-SVD, communication session. If the modem 100 is set to receive a call originated from another user, the telephone set hookswitch is in the "on-hook" position, and the controller 109 is configured with the second option setting, then the modem 100 will answer the call and establish a normal, non-SVD, communication session in either the data or the fax mode (as configured).

The following Table 1 summarizes the set of options forming the presently contemplated and preferred manner in which the detected local telephone hookswitch position is employed to correspondingly determine, in conjunction with other criteria input to controller 109, the operating mode (i.e., SVD or non-SVD) of the modem 100.

TABLE 1

| Originate or Answer Mode | Standard Data or Fax Mode | Hookswitch Control Option Setting | Local Telephone Hookswitch Position | Modem Operation in Response to the Detected Position of the Local Telephone Hookswitch |
|---|---|---|---|---|
| Originate | Either | 1 | On-hook | A data-only call is assumed. The modem attempts to originate a normal data or a fax communication session in either the data or the fax mode, as configured. |
| Originate | Either | 1 | Off-hook | A voice-only call is assumed. The modem's autodialer capability is used *only* for the purpose of placing the call. No notification signal is sent and the modem does not respond to an incoming notification signal even if detected. |
| Originate | Data | 2 | On-hook | A data-only call is assumed. The modem attempts to originate a normal data communication connection using the configured standard data operation (e.g. V.32bis). |
| Originate | Data | 2 | Off-hook | An SVD call is assumed. The modem attempts to originate a data communication connection using SVD operation. |
| Originate | Fax | 2 | On-hook | A data-only call is assumed. The modem attempts to originate a fax communication connection using the fax operation selected by the DTE (e.g. V.21 or V.17). |
| Originate | Fax | 2 | Off-hook | An SVD call is assumed. The modem attempts to originate a fax communication connection using SVD operation. |
| Answer | Either | 1 | On-hook | The modem answers the call and proceeds with establishment of a communication session as a normal data or fax modem, as configured. The answering modem uses SVD operation only if requested by the originating modem. |
| Answer | Either | 1 | Off-hook | The modem answers the call and, *if* a notification signal is detected, then no ring indication is passed to the DTE and the call is aborted. |
| Answer | Data | 2 | On-hook | A data-only call is assumed. The modem answers the call and proceeds with establishment of a data receiving session as a normal data modem. SVD operation is not used. |
| Answer | Data | 2 | Off-hook | The modem answers the call and proceeds with establishment of a data communication session using SVD operation if the originating modem indicates SVD capability. |
| Answer | Fax | 2 | On-hook | A data-only call is assumed. The modem answers the call and proceeds with establishment of a fax communication session as a normal fax modem. SVD operation is not used. |
| Answer | Fax | 2 | Off-hook | The modem answers the call and proceeds with establishment of a fax communication session using SVD operation if the originating modem indicates SVD capability. |

In Table 1, the first column indicates whether the call being processed is initiated by the user or by another party. In the first column, "Originate" refers to an outgoing call, i.e. a call or communication initiated by the local user, whereas "Answer" refers to an incoming call initiated by another (remote) user and received by the local user. The second column of Table 1 indicates the current operational mode of the modem 100. "Data" refers to a mode in which the modem 100 is configured to transmit data using the configured standard data operation, whereas "Fax" refers to a mode in which the modem 100 is configured to transmit data using the configured fax operation. "Either" indicates that the modem is configured for either "Data" or "Fax" signals. The third column indicates the hookswitch control option setting of the controller 109. Setting "1" refers to enabling of the first hookswitch control option setting, whereas setting "2" refers to enabling of a second hookswitch control option setting. The fourth column indicates the current position of the local telephone hookswitch, which is either "on-hook" or "off hook". Finally, column five describes the operation of the modem 100 in response to the position of the local telephone hookswitch, as detected by the detector 110, for the indicated control option settings.

Although Table 1 sets forth various possible responses of the modem 100 to the position of the local phone set 107 with respect to the initial establishment of the PSTN connection, the same method can also be used after a normal voice call is established during a transition to a data or fax session. Specifically, the position of the local phone hookswitch can be used to determine whether the transition is to either (1) SVD operation if the local phone set 107 is off-hook at the time that the modem either receives a command to dial from the DTE or detects fax or data notification signal sent from the remote modem, or (2) standard fax or data operation if the local phone set 107 is on-hook at this time.

The foregoing inventive method and apparatus is especially valuable for use with facsimile transmissions using SVD. During facsimile transmission, the modem is under the control of a fax application program running on the DTE and the user cannot normally intervene to set the preferred configuration of the modem to selectively use either SVD or standard fax for the call. For example, the user may wish to transmit a facsimile to a modem which is known to be capable of using either standard operation or SVD, although no simultaneous voice conversation or transmission is desired in that particular communications session. It may be preferred, in that instance, to originate the call in standard fax modem mode. This is readily accomplished in accordance with the present invention by simply maintaining the local telephone set on-hook at the time that the fax application is directed to initiate the call and transmit the document to be faxed.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

For example, while the disclosed embodiment utilizes discrete devices, these devices can be implemented using one or more appropriately programmed, general-purpose processors or special-purpose integrated circuits or digital processes or an analog of hybrid counterpart of any of these devices. Or, for example, while in the disclosed embodiment, certain apparatus is added to a modem capable of simultaneous analog and digital signal communication, this added apparatus could be alternatively disposed in an adjunct device which interfaces with this type of modem. It should also be understood that the present invention can be easily adapted for use with simultaneous digital voice and digital data transmission using techniques outlined above.

What is claimed is:

1. A communication apparatus for connection to a remote communication device via a communications network and for use with a data terminal device and a telephone set having a hookswitch movable between a first and a second position, the communication apparatus comprising:
   control means operable to define a first operating mode wherein simultaneous analog voice and digital data communication signals are transmitted to and received from the remote communication device, and a second operating mode wherein:
      when analog voice communication signals are transmitted and received, said control means disables transmission of digital data communication signals, and
      when digital data communication signals are transmitted and received, said control means disables transmission of analog voice communication signals;
   detection means, connected to said control means and to the telephone set, for detecting whether the hookswitch is in one of the first and the second position; and
   selection means, connected to said detection means and to said control means, operable to select said first operating mode when the hookswitch is in the first position and to select said second operating mode when the hookswitch is in the second position.

2. The communication apparatus of claim 1, further comprising configuration means, connected to said control means, operable to configure the communication apparatus to operate in one of a standard data mode and a facsimile mode, wherein when the communication apparatus is in said standard data mode of operation, the digital data communication signals are standard binary data communication signals, and wherein when the communication apparatus is in said facsimile mode of operation, the digital data communication signals are facsimile data communication signals.

3. A communication apparatus for connection to a remote communication device via a communications network and for use with a data terminal device and a telephone set having a hookswitch movable between a first and a second position, the data terminal device being operable to issue a control signal, the communication apparatus comprising:
   detection means, connected to the telephone set, for detecting whether the hookswitch is in one of the first and the second position;
   selection means, connected to the data terminal device, for selecting one of a first control option and a second control option; and
   control means connected to the data terminal device, said detection means, and said selection means, and operable for:
      initiating, in response to the control signal, simultaneous transmission of analog voice and digital data communication signals to the remote communication device when the hookswitch is in the first position and when said first control option is selected,
      initiating, in response to the control signal, transmission of analog voice communication signals to the remote communication device when the hookswitch is in the first position and when said second control option is selected, and
      initiate, in response to the control signal, transmission of digital data communication signals to the remote communication device, when the hookswitch is in the second position.

4. A communication apparatus for connection to a remote communication device via a communications network and for use with a data terminal device and a telephone set having a hookswitch movable between a first and a second position, the remote communication device being operable to generate a notification signal, the communication apparatus comprising:
   first detection means, operatively connected to the telephone set, for detecting whether the hookswitch is in one of the first and the second position;
   selection means, operatively connected to the data terminal device, for selecting one of a first control option and a second control option;
   second detection means operable to determine if the remote communication device is capable of transmission and receipt of simultaneous analog voice and digital data signals;
   control means connected to the data terminal device, said first and second detection means, and said selection means, and operable for:
      initiating, in response to the notification signal, simultaneous receipt of analog voice and digital data communication signals from the remote communication device when the hookswitch is in the first position, said first control option being selected and said second detection means for determining that the remote communication device is capable of transmission and receipt of simultaneous analog voice and digital data signals, initiating, in response to the notification signal, receipt of analog voice communication signals from the remote communication device when the hookswitch is in the first position and said second control option is selected, and initiating, in response to the notification signal, receipt of digital data communication signals from the remote communication device when the hookswitch is in the second position.

5. A communication apparatus for connection to a remote communication device via a communications network and for use with a data terminal device and a telephone set having a hookswitch movable between a first and a second position, the remote communication device being operable to issue a notification signal, and the data terminal device being operable to issue a control signal, the communication apparatus comprising:

first detection means, operatively connected to the telephone set, for detecting whether the hookswitch is in one of the first and the second position;

first selection means, operatively connected to the data terminal device, for selecting one of an originate mode and an answer mode;

second selection means, operatively connected to the data terminal device, for selecting one of a first control option and a second control option;

second detection means operable to determine if the remote communication device is capable of transmission and receipt of simultaneous analog voice and digital data signals; and control means connected to the data terminal device, said first and second detection means, said first selection means, and said second selection means, and operable for:

initiating, in response to the control signal, simultaneous transmission of analog voice and digital data communication signals to the remote communication device when the hookswitch is in the first position and said originate mode and said first control option are selected, initiating, in response to the control signal, transmission of analog voice communication signals to the remote communication device when the hookswitch is in the first position and said originate mode and said second control option are selected, initiating, in response to the control signal, transmission of digital data communication signals to the remote communication device when the hookswitch is in the second position and said originate mode is selected, initiating, in response to the notification signal, simultaneous receipt of analog voice and digital data communication signals from the remote communication device when the hookswitch is in the first position, said answer mode and said first control option are selected, and said second detection means determines that the remote communication device is capable of transmission and receipt of simultaneous analog voice and digital data signals, initiating, in response to the notification signal, receipt of analog voice communication signals from the remote communication device when the hookswitch is in the first position and said answer mode and said second control option are selected, and initiating, in response to the notification signal, receipt of digital data communication signals from the remote communication device when the hookswitch is in the second position and said answer mode is selected.

6. The communication apparatus of claim 5, further comprising a configuration means connected to said control means and operable to configure the communication apparatus to operate in one of a standard data mode and a facsimile mode, wherein when the communication apparatus is in said standard data mode of operation the digital data communication signals are standard binary data communication signals, and when the communication apparatus is in said facsimile mode of operation the digital data communication signals are facsimile data communication signals.

7. The communication apparatus of claim 5, wherein said control means further comprises means for initiating, in response to the control signal, transmission and receipt of simultaneous analog voice and digital data communication signals to and from the remote communication device when the hookswitch is in the first position and the communication apparatus is transmitting and receiving analog voice communication signals to and from the remote communication device.

8. A method for controlling communication between a local communication apparatus connected to a data terminal device and to a telephone set having a hookswitch movable between a first and a second position and a remote communication device via a communications network, comprising the steps of:

(a) defining a first operating mode wherein simultaneous analog voice and digital data communication signals are transmitted to and received from the remote communication device;

(b) defining a second operating mode wherein:
when analog voice communication signals are transmitted and received, transmission of digital data communication signals is disabled, and
when digital data communication signals are transmitted and received, transmission of analog voice communication signals is disabled;

(c) detecting whether the hookswitch is in one of the first and the second position; and (d) selecting said first operating mode when the hookswitch is in the first position, and said second operating mode when the hookswitch is in the second position.

9. The method of claim 8, further comprising the step (e) of configuring the local communication apparatus to operate in one of a standard data mode and a facsimile mode, wherein when the local communication apparatus is in said standard data mode of operation, the digital data communication signals are standard binary data communication signals, and wherein when the local communication apparatus is in said facsimile mode of operation the digital data communication signals are facsimile data communication signals.

10. A method for controlling communication between a local communication apparatus connected to a data terminal device and to a telephone set having a hookswitch movable between a first and a second position, and a remote communication device via a communications network, the data terminal device being operable to issue a control signal, comprising the steps of:

(a) detecting whether the hookswitch is in one of the first and the second position;

(b) selecting one of a first control option and a second control option;

(c) initiating, in response to the control signal, simultaneous transmission of analog voice and digital data communication signals to the remote communication device when the hookswitch is in the first position and when and said first control option is selected;

(d) initiating, in response to the control signal, transmission of analog voice communication signals to the remote communication device when the hookswitch is in the first position and when said originate mode and said second control option are selected; and (e) initiating, in response to the control signal, transmission of digital data communication signals to the remote communication device, when the hookswitch is in the second position, and when said originate mode is selected.

11. A method for controlling communication between a local communication apparatus connected to a data terminal device and to a telephone set having a hookswitch movable between a first and a second position and a remote communication device via a communications network, the remote communication device being operable to generate a notification signal, comprising the steps of:

(a) detecting whether the hookswitch is in one of the first and the second position;

(b) selecting one of a first control option and a second control option;

(c) determining if the remote communication device is capable of transmission and receipt of simultaneous analog voice and digital data signals;

(d) initiating, in response to the notification signal, simultaneous receipt of analog voice and digital data communication signals from the remote communication device when the hookswitch is in the first position, said first control option is selected, and said remote communication device is capable of transmission and receipt of simultaneous analog voice and digital data signals;

(e) initiating, in response to the notification signal, receipt of analog voice communication signals from the remote communication device when the hookswitch is in the first position and said second control option is selected; and (f) initiating, in response to the notification signal, receipt of digital data communication signals from the remote communication device when the hookswitch is in the second position.

12. A method for controlling communication between a local communication apparatus connected to a data terminal device and to a telephone set having a hookswitch movable between a first and a second position and a remote communication device via a communications network, the remote communication device being operable to generate a notification signal, and the data terminal device being operable to issue a control signal, comprising the steps of:

(a) detecting whether the hookswitch is in one of the first and the second position;

(b) selecting one of a first control option and a second control option;

(c) selecting one of an originate mode and an answer mode;

(d) determining if the remote communication device is capable of transmission and receipt of simultaneous analog voice and digital data signals;

(e) initiating, in response to the control signal, simultaneous transmission of analog voice and digital data communication signals to the remote communication device when the hookswitch is in the first position and said originate mode and said first control option are selected;

(f) initiating, in response to the control signal, transmission of analog voice communication signals to the remote communication device when the hookswitch is in the first position and said originate mode and said second control option are selected;

(g) initiating, in response to the control signal, transmission of digital data communication signals to the remote communication device when the hookswitch is in the second position and said originate mode is selected;

(h) initiating, in response to the notification signal, simultaneous receipt of analog voice and digital data communication signals from the remote communication device when the hookswitch is in the first position, said answer mode and said first control option are selected, and said second detection means determines that the remote communication device is capable of transmission and receipt of simultaneous analog voice and digital data signals;

(i) initiating, in response to the notification signal, receipt of analog voice communication signals from the remote communication device when the hookswitch is in the first position and said answer mode and said second control option are selected; and (j) initiating, in response to the notification signal, receipt of digital data communication signals from the remote communication device when the hookswitch is in the second position and said answer mode is selected.

13. The method of claim 12, further comprising the step (k) of configuring the communication apparatus to operate in one of a standard data mode and a facsimile mode, wherein when the communication apparatus is in said standard data mode of operation the digital data communication signals are standard binary data communication signals, and when the communication apparatus is in said facsimile mode of operation the digital data communication signals are facsimile data communication signals.

14. The method of claim 12, further comprising the step (1) of initiating, in response to the control signal, transmission and receipt of simultaneous analog voice and digital data communication signals to and from the remote communication device when the hookswitch is in the first position and the communication apparatus is transmitting and receiving analog voice communication signals to and from the remote communication device.

* * * * *

UNITED STATES PATENT AND TRADEMARK OFFICE
CERTIFICATE OF CORRECTION

PATENT : 5,946,304

DATED : August 31, 1999

INVENTOR(S) : Chapman, et al.

It is certified that error appears in the above-identified patent and that said Letters Patent is hereby corrected as shown below:

On the title page, delete the print/illustrative figure and substitute therefor the print/illustrative figure, which is FIG. 1, as shown on the attached page.

In the Drawings, delete FIG. 1, and substitute therefor FIG. 1, as shown on the attached page.

Signed and Sealed this

Second Day of May, 2000

*Attest:*

Q. TODD DICKINSON

*Attesting Officer*     *Director of Patents and Trademarks*

United States Patent And Trademark Office
CERTIFICATE OF CORRECTION

PATENT NO. : 5,946,304
DATED : August 31, 1999
INVENTOR(S): Chapman et al.

It is certified that error appears in the above-identified patent and that said Letters Patent is hereby corrected as shown below. Please replace FIG. 1 with FIG. 1 hereinafter.

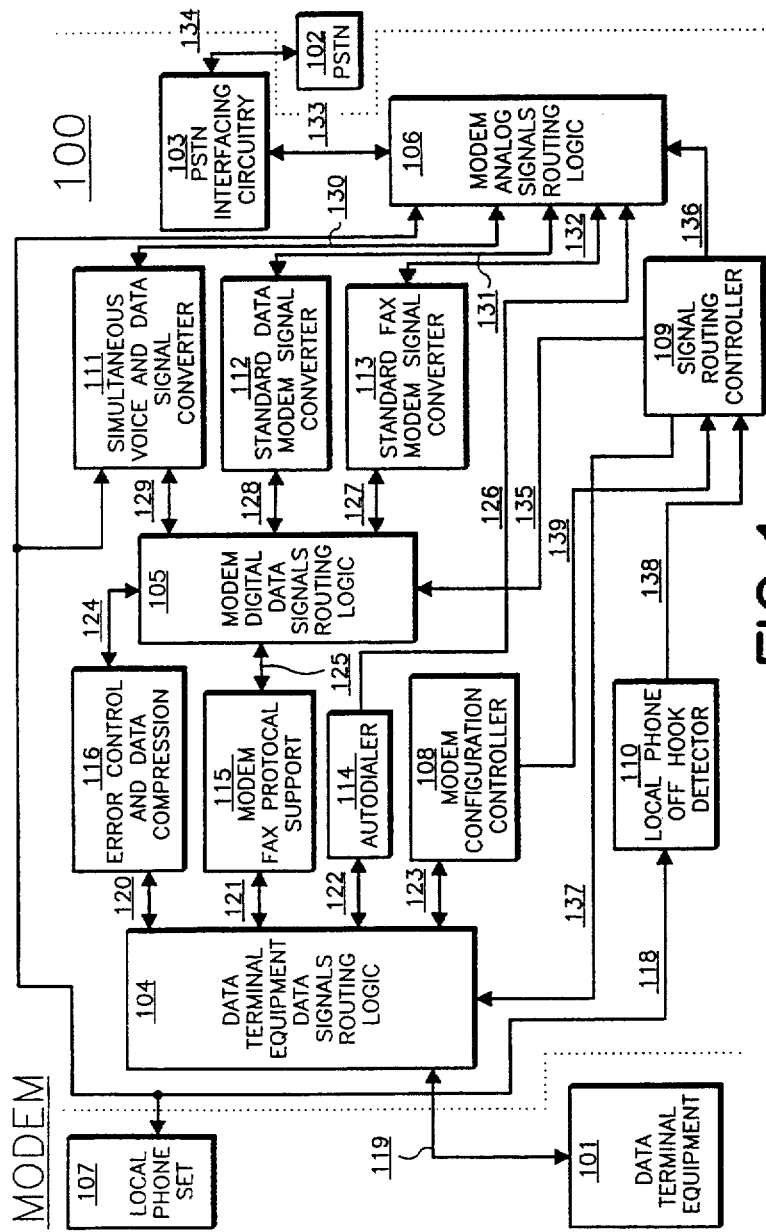

FIG. 1